Sept. 19, 1939.                C. R. DOWNS ET AL                      2,173,802
                    HUMIDITY CONTROL METHOD AND APPARATUS
                    Filed Jan. 25, 1936                2 Sheets-Sheet 2
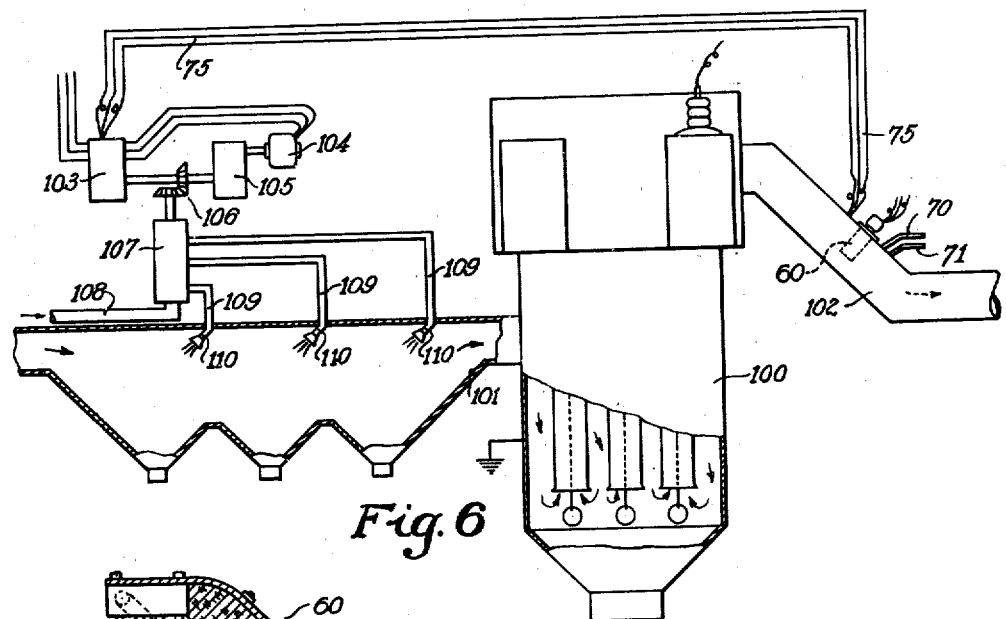
Fig. 6
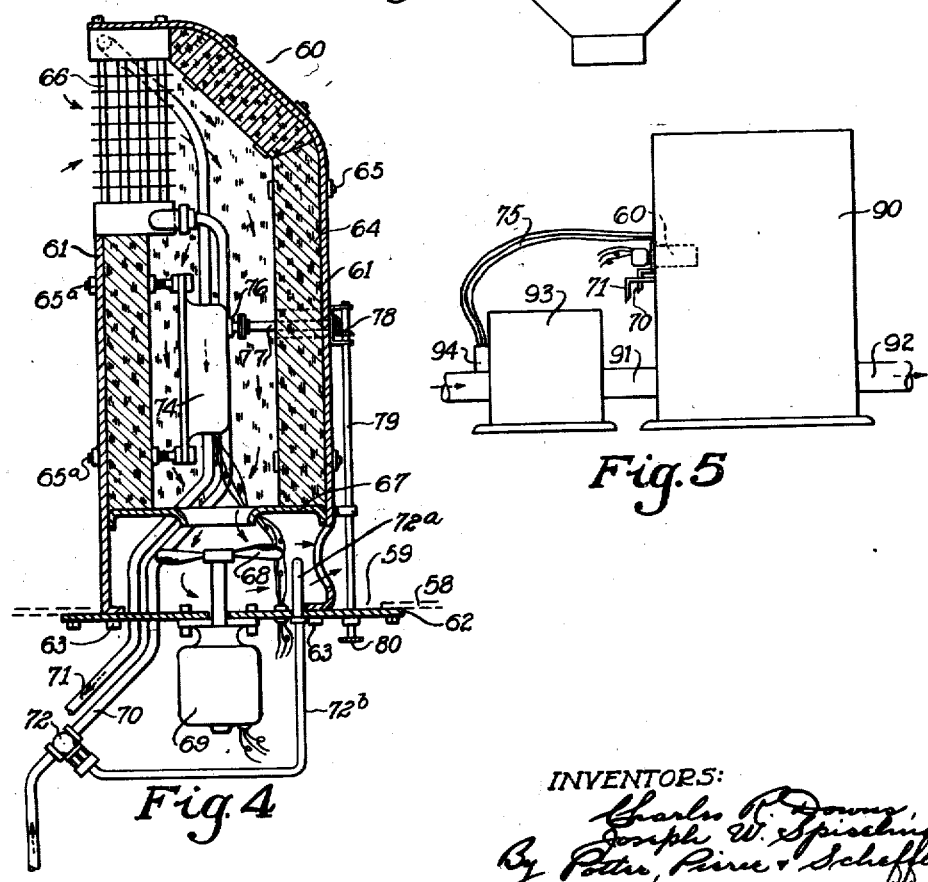
Fig. 4
Fig. 5
INVENTORS:
Charles R. Downs,
Joseph W. Spiselman,
By Potter, Pirie & Scheffler,
Attorneys.

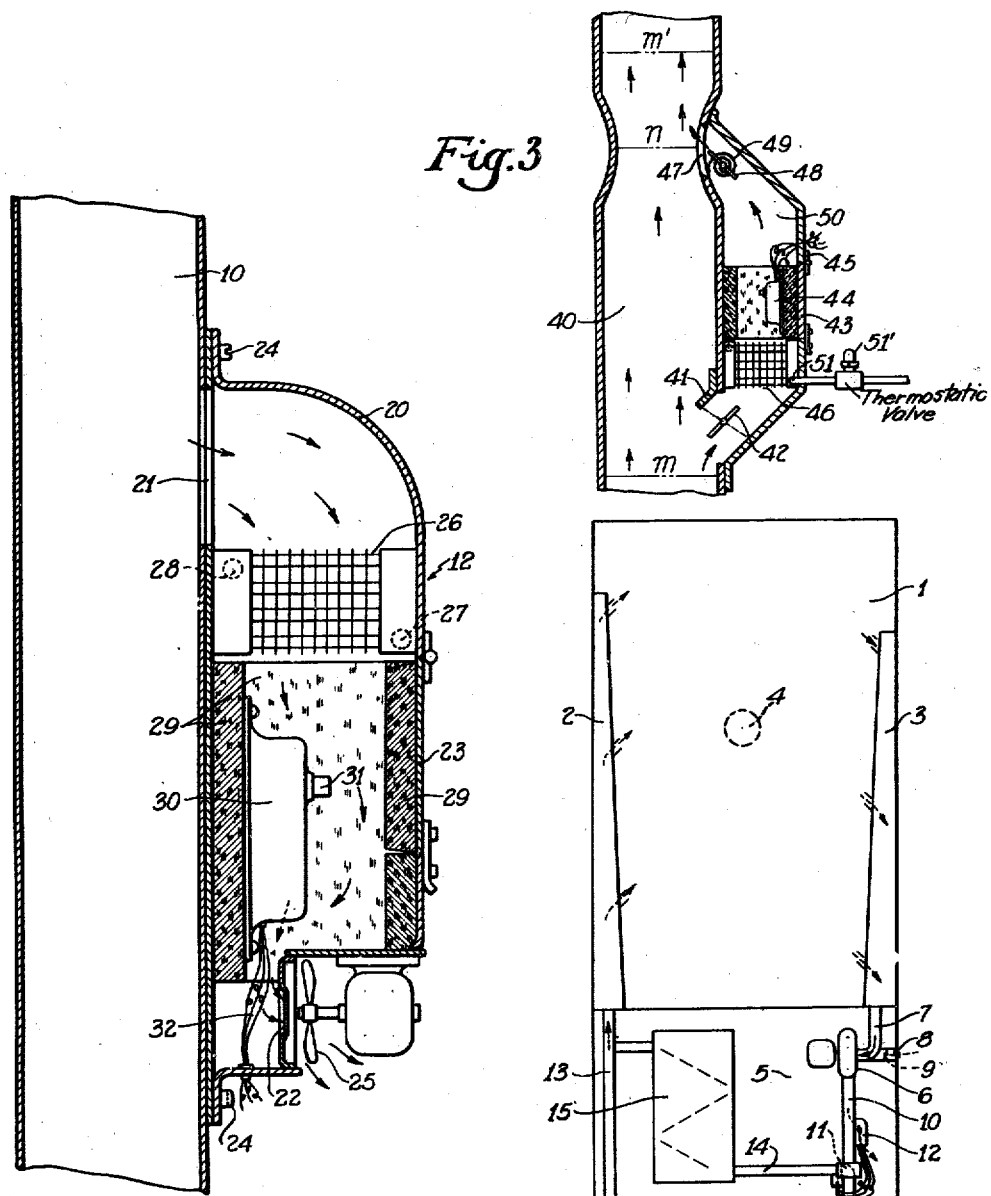

Patented Sept. 19, 1939

2,173,802

UNITED STATES PATENT OFFICE 2,173,802

HUMIDITY CONTROL METHOD AND APPARATUS

Charles R. Downs, Old Greenwich, Conn., and Joseph W. Spiselman, Brooklyn, N. Y., assignors, by mesne assignments, to The Calorider Corporation, Old Greenwich, Conn., a corporation of Connecticut Application January 25, 1936, Serial No. 60,878

15 Claims. (Cl. 236—44)

This invention relates to humidity control methods and apparatus for regulating the humidity or dew point of air or other gases in rooms, gas holders, chambers, conduits or other closed spaces.

More particularly, the invention relates to control methods and control apparatus for maintaining the absolute humidity or the dew point of the air or other gas in an enclosure approximately constant regardless of the temperature and pressure of the air or gas, that is, the air or gas will contain a prescribed number of grains of moisture per cubic foot at all times.

Objects of the invention are methods and apparatus responsive to changes in relative humidity but operative to control the absolute humidity or dew point of the body of air or other gas. Further objects are to provide control methods and control devices for regulating the absolute humidity of a body of gaseous fluid, which methods and devices are characterized by the withdrawal of a small portion of the gaseous fluid from the entire body, the cooling of the withdrawn portion to bring it to a preselected temperature, and the control of the mechanism for regulating the humidity of the entire body of the gaseous fluid by changes in the relative humidity of the withdrawn portion of constant temperature.

Another object of the invention is to provide control methods and control devices for so regulating the humidifying and dehumidifying apparatus associated with a gaseous fluid in an enclosure that the absolute humidity of the fluid is maintained constant regardless of the temperature and/or pressure of the gaseous fluid. A further object is to provide control methods and control devices for maintaining a selected dew point of a gaseous fluid, which methods and devices are characterized by a humidity control based upon a temperature substantially different from the dew point maintained in the gaseous fluid.

More particularly, an object of the invention is to provide control apparatus of enhanced sensitivity for maintaining a volume of gas at a constant absolute humidity below the saturation point, the apparatus including mechanism for withdrawing a small stream of the gas from the enclosed volume and cooling the withdrawn stream to a selected temperature to increase its relative humidity, and a hygroscopic control device responsive to changes in the relative humidity of the stream for regulating the humidity of the volume of gas.

The invention has been found useful in air conditioning and operates to maintain the relationship between relative humidity and temperature such that comfort conditions prevail during periods of warm weather. But, while the invention will be described with particular reference to air conditioning for human comfort, it may be employed advantageously in various industrial systems where the absolute humidity should be maintained at selected values.

The usefulness and importance of the invention for air conditioning is apparent when it is recognized that a suitably chosen line of constant absolute humidity will cross the summer comfort zone on so-called "Comfort Charts" within limits where comfort conditions will exist for most people with but few exceptions. For example, the average person, at an air motion of 6.0 miles per hour, would sense essentially the same comfort at 89° F. and 5.5 grains of moisture per cubic foot as at 77° F. and 5.5 grains of moisture per cubic foot. The former is a condition of 38% relative humidity, and the latter 55% relative humidity. At an air velocity of 8.7 miles per hour, the average person would sense essentially the same comfort at 89° F. and 6 grains per cubic foot and 79° F. and grains per cubic foot. This corresponds to 42% relative humidity for the first temperature, and 57% relative humidity for the second. When the velocity of air motion is less than in the examples given above, the absolute humidity should be held at a lower level to attain comfort; for example, at say 5 grains per cubic foot, which approximates a dew point of 57° F. In other words, at the higher dry bulb temperatures, the relative humidity should be less than at lower temperatures to provide comfortable conditions. It follows that an enclosure with varying summer air temperatures may be conditioned to give a satisfactory feeling of comfort to the average person by maintaining the absolute humidity at a constant value chosen with due regard for the velocity of the air moving through the enclosure.

While the factors in atmospheric conditions providing comfort to human beings are not fully understood, it is believed that they comprise to a considerable extent the balancing of heat transference by radiation with transference by convection currents and latent heat used in evaporating body moisture. In summer, when the surroundings rise in temperature and the body loses less heat by radiation and convection, it is necessary for comfort that the relative humidity of the air contacting the body decrease. This latter condition increases the rate of evaporation of moisture and increases the dissipation of heat by that means. As stated previously, if the absolute humidity of the air is kept constant, the corresponding decrease in relative humidity with rise in air temperature will remain in proper relationship for human comfort. The amount of moisture to be maintained in the air depends upon certain conditions, including those affecting transference by convection, i. e. the velocity of the air moving past the people seeking bodily comfort. The higher the velocity of air flow, the greater the amount of moisture in the air, that is, the absolute humidity, that can be tolerated.

The following summary provides a brief disclosure of the manner in which the present invention maintains these desired conditions. A surface readily capable of heat exchange, say a water cooled air fin radiator, is maintained at approximately constant temperature, a portion of the air in or being removed from the enclosure is brought to approximately constant temperature by passing it adjacent said surface, a hygroscopic control device sensitive to changes in relative humidity is placed in contact with the constant temperature air portion, and dehumidifying means available for removing moisture from the air supplied the enclosure is made to function in response to impulses from the hygroscopic control device.

The hygroscopic control device in the constant temperature air portion is set for any preselected relative humidity that will correspond to a desired absolute humidity for the larger body of air which is subject to temperature variations.

A control system and method of operation comprising a preferred embodiment of our invention whereby the above mentioned and other objects can be realized is set forth in the following description and accompanying drawings. Reference is made also to alternate applications of the invention and to apparatus useful therewith. In the drawings:

Fig. 1 is a diagrammatic representation of an enclosure where people assemble and of a system in accordance with the present invention for maintaining the atmosphere of the enclosure at summer comfort conditions;

Fig. 2 is a side elevation in partial section of control equipment comprised in a preferred embodiment of the invention;

Fig. 3 is a fragmentary sectional view of another arrangement of control equipment for carrying out the objects of the invention;

Fig. 4 is a sectional elevation of an instrument in compact form for controlling humidity conditions in accordance with the invention;

Fig. 5 shows diagrammatically the adaptation of the instrument shown in Fig. 4 to the problem of maintaining the humidity of the gas in a holder at desired values; and Fig. 6 shows diagrammatically the adaptation of the instrument shown in Fig. 4 to the problem of maintaining the humidity or dew point of a stream of gas entering an electrical precipitator at a value suitable for effective treatment of the gas.

In Fig. 1 of the drawings, the reference numeral 1 identifies an enclosure to which conditioned air is supplied through a flue 2 and from which air is withdrawn through a flue 3, a ventilator 4 which may be in the ceiling or a wall permitting a part of the air to pass to the atmosphere. The air withdrawn from the enclosure is circulated through the air conditioning room 5 by a fan 6 which is connected to the flue 3 by the conduit 7 and to atmosphere by a duct 8 which is provided with a damper 9. The outlet conduit 10 leads to a junction box that houses a damper 11 and the control mechanism 12 of this invention is associated with the conduit 10. Air passing through the conduit 10 may be passed, in different proportions according to the setting of the damper 11, through the conduit 13 that leads directly to the flue 2 and through the conduit 14 which leads through a dehumidifying unit 15 to the conduit 13 or, if desired, to the flue 2. The setting of the damper 11 is determined, by means which are well known in the art, by the operation of the control apparatus 12.

An appropriate form of control apparatus is shown in vertical section in Fig. 2. The unit comprises a casing 20 which has an upper inlet 21 that opens into the conduit 10 and a lower outlet 22, and, preferably, an inspection door 23. The unit is attached to the conduit 10 by screws 24 and a small fan 25 withdraws a small quantity of air from the conduit, the air flow being indicated by the arrows. A small heat exchanger 26, preferably of the type including a plurality of thin tubes having heat radiating fins is positioned below the air inlet 21, the headers of the heat exchanger having connections 27, 28 for circulating a cooling fluid through the tubes. The inlet connection is connected to a fluid supply of constant, or approximately constant temperature which may be, and preferably is, tap water, as we have found that the temperature of the water supply in cities is substantially free from appreciable fluctuations over relatively long periods. The interior of casing 20 below the heat exchanger is lined with heat insulating material 29 and a hygroscopic control device 30 is positioned in the path of the cooled air. The control device has an adjusting element 31 for regulating the relative humidity at which contacts, not shown, are closed in response to variations of relative humidity above and below a preselected value. The exact construction of the control device is not an essential feature of this invention but we prefer the type such as the humidostat described in our copending application Serial No. 25,596, filed June 8, 1935, in which the dimensions of a control element change with variations in the relative humidity, and the changes in dimensions determine the actuation of electric switches or the like which, in turn, control the operation of the humidity altering apparatus. The operating characteristics of such control devices are that the dimensional changes follow the changes in relative humidity of the adjacent air and, due to the fact that the stream of air which is drawn through casing 20 by fan 25 is cooled to a constant temperature, the limiting values of relative humidity which correspond to the selective closing of the contacts associated with the conductors 32 correspond to limiting values of the absolute humidity of the air withdrawn from enclosure 1 through flue 3, conduit 10 and casing 20. The manner in which the control device 30 regulates the damper 11 to return all of the air to the enclosure 1 through the conduit 13 when the absolute humidity is below a desired value, and to pass the air through the dehumidifier 15 when the absolute humidity is too high will be understood by those familiar with the art.

The results obtained with the system illustrated in Figs. 1 and 2 can be illustrated by the following examples. When cooling water for radiator 26 is available at an approximately constant temperature of 70° F., the radiator will maintain the small amount of air passing at 73° F. The air, in living quarters in the vicinity of New York city, is kept in motion by means of fans at an average velocity of 9 feet per second (about 6 miles per hour). A line of 5.5 grains of moisture per cubic foot absolute humidity lies well within the comfort zone for the range of comfort temperature at this air motion. At 73° F. a moisture content of 5.5 grains per cubic foot equals 63% relative humidity. The control humidostat is set with control button 31 at that point (63% relative humidity) and air from the enclosure, cooled to 73° F., is circulated over the instrument. When the temperature in the enclosure is at 85° F. the 5.5 grains of moisture per cubic foot will furnish a relative humidity of 43% which is a comfort zone condition. When the moisture content of the air from the enclosure exceeds 5.5 grains, say 5.8 grains per cubic foot (giving 45% relative humidity at 85° F.) the air will be, when chilled by radiator 26 to 73° F., at a relative humidity of 66% and this condition will cause control 30 to close damper 11 and cause the air to pass through the dehumidifier 15. When the moisture content has been reduced to 5.5 grains, the damper 11 will be again adjusted by the control instrument to bypass the circulating air stream around the dehumidifier.

Similarly, at 80° F., a moisture content of 5.5 grains is 50% relative humidity, and at 77° F., 5.5 grains is 55% relative humidity, and both conditions as well as those of intermediate temperatures are well within the comfort range under the chosen conditions.

It can thus be seen that no matter what the temperature conditions are within the enclosure, the instrument will always hold a constant absolute humidity therein. This leads to a relationship of relative humidity and reasonable dry bulb temperature within the enclosures which results in satisfactory comfort conditions. If the temperature is not suitable, it can be modified by independent means.

It is also of interest to note that an increase in sensitivity of control is obtained due to the chilling of the air. The average control humidostat operates on a fixed change in relative humidity from a starting to a stopping point. A given change in absolute humidity represents a larger change in relative humidity as the temperature of air is lowered. This leads to the humidostat as we use it becoming a more sensitive instrument for the control of humidity within the enclosure which is at a higher temperature than the humidostat. When the air passing in contact with the humidostat is cooler than 73° F. as stated above, the sensitivity of control is further enhanced. For example, assuming a humidostat which will operate within a 2% relative humidity range, if the air flowing past the humidostat is cooled from 85° F. to 62° F., this humidostat will maintain a range of absolute humidity of 5.5 to 5.6 grains per cubic foot. Whereas if the humidostat were used in the conventional manner with air at 85° F. flowing past it, the absolute humidity would fluctuate between 5.5 and 5.8 grains per cubic foot. Cooling to this temperature may be conveniently attained by the use of well water, ice water, or from mechanical refrigeration sources.

The particular manner in which the control impulses are transmitted to the dehumidifier means is not an essential part of our invention, and mechanical movements, hydraulic relays and the like can be substituted for the electrical relay we use by preference where such alternatives furnish the required reliability. Nor do we claim that any particular type of dehumidifier is necessary for carrying out our invention. Excellent results have been obtained with the dehumidifying apparatus described in Downs' Patents, Nos. 2,026,935 and 2,026,936 issued on January 7, 1936. Apparatus based upon the principle of absorption or refrigeration or any other dehumidifying principle can be used if the air is made available in the inhabited enclosure within the temperature and humidity ranges necessary for comfort conditions.

The apparatus shown diagrammatically in Fig. 1 does not include mechanism for increasing the humidity to maintain the moisture content of the air within predetermined limits when the general atmospheric conditions are such as to lower the absolute humidity.

The above description of a control of a dehumidifier 15 is to be understood as constituting merely an example of one application of the invention, as the air conditioning apparatus which is regulated by a humidostat subjected to a small volume of air at constant temperature may be of any desired type and may include a humidifier and/or a dehumidifier unit.

Where the air to be tested is not at a pressure above atmospheric or is not moving at appreciable velocity, it is necessary to provide a fan or the like, as shown in Fig. 2, to cause a portion of the air to flow into and through the test space. An alternate arrangement wherein advantage is taken of the velocity head of the moving air stream to be tested is shown in Fig. 3. Test chamber 50 is attached to, or made a part of, flue 40 and has a member 41 projecting into flue 40 to divert a portion of the air through radiator 46 and past a hygroscopic control device 44 mounted on panel 43. Panel 43 is secured to the casing by a hinge 45 to facilitate the inspection and adjustment of the instrument 44. Instead of liberating the tested air into the control room, as shown in Figure 2, the air is returned to the flue through outlet opening 47. To increase the induction of the air through outlet 47 into flue 40, the flue is reduced in cross section between planes m and m' in the manner used in Venturi meters and opening 47 is positioned adjacent plane n of minimum cross section. The flow of air through chamber 50 may be interrupted by manually operated damper 42 at periods of inspection or as desired. An outlet damper 48 can also be manually operated but it has been found advantageous to operate this damper with thermostatic means 49 which responds to changes in temperature of the air passing through the chamber. If the velocity of the air in flue 40 changes or there is a change in the temperature of the water passing through radiator 46, the air passing the control device 44 may change in velocity and temperature and thus cause the device to respond at improper values of absolute humidity. Thermostat 49 can be set to retard or increase the flow of air through chamber 50 and radiator 46 in response to changes of temperature and so tend to keep the temperature of the air passing element 44 at a selected constant temperature.

Control of temperature and heat transfer conditions in control chamber 50 can also be effected by inserting a thermostatically controlled valve 51' in the inlet 51 for cooling water. When the entering water is at a temperature differing from that which is normally supplied to the heat exchanger, the flow of water is modulated by the valve 51' to maintain substantially constant operating conditions.

The apparatus that is shown in Fig. 4 is a complete unit that may be inserted into a stream or body of gas to regulate the humidifying or dehumidifying apparatus. The unit may be mounted on a wall 58 of a container or conduit, to project through an opening 59 therein, and the unit, designated generally by numeral 60, includes a casing 61 that is secured to an end mounting plate 62 by screws 63. A lining of heat insulating material 64 is secured to the interior of the casing 61 by bolts 65. A heat exchanger 66 is positioned at the outer or inlet opening into the casing, and a slow circulation of gas in induced through the casing 61, and returned to the main enclosure or conduit through ports in an end plate 67 and the casing 61, by a fan 68 that is rotated by a motor 69 which is mounted on the exterior of the plate 62. A cooling medium, which may be tap water, is circulated through the pipes of the heat exchanger through an inlet pipe 70 and drain pipe 71, the pipes being preferably flexible to facilitate the installation and removal of the unit. The flow of cooling water may be adjusted manually by a valve 72 or, as illustrated, a temperature sensitive bulb 72ª may be located adjacent the gas exit opening and connected to the valve 72 by a conduit 72ᵇ to modulate the opening and closing of valve 72 in accordance with exit gas temperature. Gas tight bushings, not shown, will be provided where the pipes 70, 71 pass through the plate 62 when the gases are toxic or under a pressure substantially different from atmospheric. The control element 74 which responds to changes in relative humidity to actuate the contacts, not shown, for the conductors 75 is mounted within the casing by bolts 65ª. The member 76 which may be adjusted to regulate the control point is connected by a shaft 77 and bevel gears 78 to shaft 79 that carries an adjusting dial 80 located at the exterior face of the mounting plate 62.

The method of operation of this unit will be apparent from the above description of other embodiments of the invention. As in the Fig. 3 form of the invention, the small stream of withdrawn gas is returned to the main body of gas after it has been cooled to a definite temperature to actuate the hygroscopic control 74 that responds to changes in relative humidity. The humidity altering apparatus, whether a humidifier, a dehumidifier or both, is actuated by circuits established through the conductors 75 to maintain the absolute humidity of the body of gas within a certain preselected range or, alternatively, to prevent the absolute humidity from falling below or rising above some preselected value. In the case of a humidifier system of the rotary disk unit type in which moisture is discharged directly into the room, the complete unit 60 will be mounted at some point in the room where an average, or if desired, a critical condition exists. In such installations, the mounting plate need not be secured to the wall of the enclosure or room, but is supported on a bracket at the selected position within the room.

In Fig. 5, the enclosure 90 may be a gas holder or reaction chamber having an inlet conduit 91 and outlet conduit 92 for producing a continuous or an intermittent flow of gas through the chamber. A complete gas circulating and control unit 60, such as shown in Fig. 4, is secured to and projects into the interior of the enclosure 90. The circulation of a cooling medium of constant or approximately constant temperature through the heat exchanger of the unit 60 results in a humidity control, as determined by impulses transmitted through the conductors 75 to a humidity regulating system 93, which maintains the gas within the enclosure at a substantially constant humidity. This embodiment of the invention is useful where it is desired to maintain gas in a holder, or in a work room or processing chamber at or above a critical dew point. If a condition of saturation is to be avoided it can be assumed, from past experience, that the temperature within the enclosure will not fall below some definite value, and an absolute humidity value for the gas is selected which will be, for example, just above the dew point at the minimum temperature. The control instrument 74 is so adjusted, by control knob 80, and the humidity reducing mechanism 93, that the absolute humidity of the gas in the enclosure 90 does not rise above some selected maximum value which is permissible for all temperatures of the gas. Another important use of this form of the invention is in the control of the humidity of air supplied to the operating mechanisms of railway switches and other remotely controlled devices where condensation of moisture is detrimental.

An application of the invention to an electrical precipitator 100 is illustrated in Fig. 6. A mechanical settling chamber 101 precedes the electrical precipitator and a control unit 60 is inserted in the outlet conduit 102 to respond to relative humidity at constant temperature, and thereby to control the absolute humidity of the gas passing through the precipitator. The conductors 75 of control unit 60 extend to the regulating unit 103 that determines the actuation, and sense of actuation of a motor 104 which, through a transmission box 105 and gears 106, adjusts the valve mechanism 107 that controls the flow of water from supply pipe 108 to one or more of the pipes 109 that terminate in spray nozzles 110.

This application of the invention to electrical precipitators is of distinct importance because of the not unusual requirement that gases be humidified before treatment. Furnace gases change in initial moisture content, dust burden, and temperature and manual operation of humidifying means has not proven satisfactory. The dew point must not be reached in precipitators designed to collect material in dry state, therefore the absolute humidity must be so controlled as to remain below saturation and yet maintained high enough to provide for satisfactory electrical conditions in the precipitator. Humidity control is important, also, where the cleaning of gases is accomplished in other types of apparatus. Filter bags plug quickly if the dust collected becomes sticky from a high moisture content of the gas. With separators of the cyclone type, the removal of dust from air containing considerable moisture tends to render the separator inoperative because the dust clings to the surfaces of the separator and plugs the dust outlet.

The control methods and apparatus of the invention are thus useful in connection with the treatment of different gases in various industrial processes, and, where unsuitable temperatures and/or detrimental substances such as dusts or corrosive gases are encountered, the humidostatic element may be protected by washing or filtering the stream of gas.

An automatic control for fixed dew point or absolute humidity condition in gases which are changing or may change in temperature and consequently cannot be controlled for fixed dew point or absolute humidity by a humidostat of the usual type is provided by the present invention. The applicability of the invention is not to be determined by the above illustrations but is limited solely by the appended claims.

We claim:

1. A humidity control unit for regulating the humidity of gas within a container in accordance with the measured relative humidity of a sample of gas withdrawn from the container, said unit comprising a casing, means for passing through said casing a sample stream of gas from said container, heat exchange means for cooling said gas stream to a substantially constant temperature, and adjustable humidity control means including an element that changes dimensions with changes of relative humidity positioned in the path of said gas stream of constant temperature.

2. A humidity control unit comprising a casing having inlet and outlet openings adapted to be alined with spaced openings in a conduit through which gas flows, means at the inlet opening for deflecting a portion of the gas flow in said conduit through said casing, heat exchange means adjacent the inlet opening of said casing for cooling said deflected portion of the gas substantially to a predetermined temperature, and hygroscopic control means positioned in the path of said portion of gas of predetermined temperature.

3. A humidity control unit comprising a casing, means for creating a gas stream through said casing, heat exchange means for cooling said gas stream to a substantially constant temperature, and hygroscopic control means positioned in the path of said gas stream of constant temperature; said unit including a mounting plate for securing said casing to a wall of and positioned within an enclosure, and said means for creating a gas stream comprising a fan within said casing and actuated by a motor secured to said plate at the side opposite said casing.

4. The combination with apparatus for adjusting the moisture in the air contained within an enclosure, of a control unit for measuring the relative humidity of a sample of air from said enclosure, said control unit comprising a heat-exchange surface, means for maintaining the surface at approximately a constant temperature lower than that of the air within said enclosure, means for withdrawing a sample stream of said air from said enclosure and directing the same adjacent said surface, an adjustable humidostat including an element which changes dimensions with changes in relative humidity positioned in the path of said stream beyond said surface, and means for the transmission of control impulses from said humidostat to said apparatus.

5. Apparatus for controlling the amount of moisture in a confined body of gaseous fluid comprising humidity altering means associated with said body of fluid, sampling means for separating representative portions of said body of fluid from the main body, a temperature controlling surface positioned to contact said sample portions to bring the temperature thereof substantially to a predetermined constant value lower than that of said body of gaseous fluid, control means which changes dimensions in response to changes in relative humidity, means for passing said separated portions of constant temperature fluid into contact with said control means, and means for transmitting control impulses from said control means to said humidity altering means.

6. Apparatus for maintaining the absolute humidity of the gas within an enclosure below a predetermined value, said apparatus comprising means for withdrawing gas from said enclosure and returning the same through a treating room, a temperature exchange device and means for circulating therethrough a fluid of substantially constant temperature lower than that of the gas within said enclosure, means for bypassing a fraction of the withdrawn gas in contact with said heat exchange means, a hygroscopic control device responsive to changes in relative humidity and positioned in the path of said by-passed fraction beyond said heat exchange means, humidity altering apparatus in said treating room, and means actuated by said hygroscopic control device for regulating the operation of said humidity altering apparatus to maintain the absolute humidity of the gas within said enclosure substantially contant.

7. In humidity control apparatus, the combination with a container through which a gas passes in transit to a point remote from the container, and means for introducing moisture into said gas prior to its entrance into said container, of control means for regulating the operation of said moisture introducing means; said control means comprising an adjustable humidity control device including an element that changes dimensions with changes in relative humidity, means for contacting said device with a portion of the gas leaving said container, and means for cooling said portion of the gas to a predetermined temperature above its dew point before it is contacted with said device.

8. In humidity control apparatus, the combination with a container through which a gas is passed, and means for removing moisture from said gas prior to its entrance into said container, of control means for regulating the operation of said moisture removing means; said control means comprising an adjustable humidity control device including an element that changes dimensions with changes in relative humidity, means for contacting said device with a portion of the gas leaving said container, and means for cooling said portion of the gas to a predetermined temperature above its dew point before it is contacted with said device.

9. Apparatus of the type stated comprising a container enclosing a gas, means for altering the humidity of the gas within said container, control means for determining the operation of said humidity altering means, said control means comprising an adjustable humidostat including an element that changes dimensions with changes in relative humidity, means for contacting said control means with a sample stream of gas drawn from said container, and means for cooling said stream of gas substantially to a predetermined temperature above its dew point prior to its contact with said control means.

10. The process of conditioning the air within a room to maintain comfort conditions as the room temperature varies in summer, which process comprises withdrawing air from the room, cooling a small sample portion of the withdrawn air substantially to a fixed temperature, varying the moisture content of the withdrawn air in accordance with the measured relative humidity of the sample portion of substantially fixed temperature, and returning the withdrawn air to the room, whereby the absolute humidity of the air within the room may be held substantially constant as the room temperature varies.

11. The process of maintaining comfort conditions in a room as the room temperature varies in summer which comprises establishing an air current within the room by withdrawing air therefrom and supplying air thereto, cooling a sample portion of the withdrawn air substantially to a predetermined temperature, measuring the relative humidity of the sample portion at said predetermined temperature, and regulating the moisture content of the air supplied to the room in accordance with the measured relative humidity of the cooled sample portion, thereby to maintain the absolute humidity of the air within the room substantially constant as the temperature thereof varies.

12. A humidity control unit for regulating the operation of humidifying apparatus located apart from said unit in accordance with the relative humidity of a small sample volume of gas, said unit comprising a casing having inlet and outlet openings, a multitube heat exchanger in the casing adjacent the inlet opening, said heat exchanger having connecting means for establishing a flow of cooling fluid through the tubes, and an adjustable humidity-responsive control device including an element which changes dimension with changes in humidity, said device being located in said casing between the heat exchanger and the outlet opening.

13. A humidity control unit for regulating the operation of humidifying apparatus located apart from said unit in accordance with the relative humidity of a small sample volume of gas, said unit comprising a casing having walls defining a passage open between an inlet and an outlet end, a gas cooling device in said passage at the inlet end, means for circulating a cooling liquid through said gas cooling device, an adjustable humidity-responsive control device in said passage between the gas cooling device and the outlet end of the casing, and an adjustable temperature-responsive device within said casing for regulating the cooling effect of said liquid.

14. The invention as claimed in claim 13, in combination with heat insulating means lining the portion of said passage in which said humidity-responsive device is located.

15. In humidity control apparatus, the combination with means defining a duct system through which a gas is passed, and means for adjusting the moisture content of the gas prior to its discharge from the duct system; of control means for regulating the operation of said adjusting means, said control means comprising an adjustable humidostat having an element that changes dimensions with changes in relative humidity, means for contacting said element with a portion of the gas leaving the duct system, and means for cooling said portion of the gas to a predetermined temperature above its dew point before it contacts said element.

CHARLES R. DOWNS.
JOSEPH W. SPISELMAN.

CERTIFICATE OF CORRECTION.

Patent No. 2,173,802.     September 19, 1939.

CHARLES R. DOWNS, ET AL.

It is hereby certified that error appears in the printed specification of the above numbered patent requiring correction as follows: Page 5, second column, line 23, claim 6, for "contant" read constant; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.

room, whereby the absolute humidity of the air within the room may be held substantially constant as the room temperature varies.

11. The process of maintaining comfort conditions in a room as the room temperature varies in summer which comprises establishing an air current within the room by withdrawing air therefrom and supplying air thereto, cooling a sample portion of the withdrawn air substantially to a predetermined temperature, measuring the relative humidity of the sample portion at said predetermined temperature, and regulating the moisture content of the air supplied to the room in accordance with the measured relative humidity of the cooled sample portion, thereby to maintain the absolute humidity of the air within the room substantially constant as the temperature thereof varies.

12. A humidity control unit for regulating the operation of humidifying apparatus located apart from said unit in accordance with the relative humidity of a small sample volume of gas, said unit comprising a casing having inlet and outlet openings, a multitube heat exchanger in the casing adjacent the inlet opening, said heat exchanger having connecting means for establishing a flow of cooling fluid through the tubes, and an adjustable humidity-responsive control device including an element which changes dimension with changes in humidity, said device being located in said casing between the heat exchanger and the outlet opening.

13. A humidity control unit for regulating the operation of humidifying apparatus located apart from said unit in accordance with the relative humidity of a small sample volume of gas, said unit comprising a casing having walls defining a passage open between an inlet and an outlet end, a gas cooling device in said passage at the inlet end, means for circulating a cooling liquid through said gas cooling device, an adjustable humidity-responsive control device in said passage between the gas cooling device and the outlet end of the casing, and an adjustable temperature-responsive device within said casing for regulating the cooling effect of said liquid.

14. The invention as claimed in claim 13, in combination with heat insulating means lining the portion of said passage in which said humidity-responsive device is located.

15. In humidity control apparatus, the combination with means defining a duct system through which a gas is passed, and means for adjusting the moisture content of the gas prior to its discharge from the duct system; of control means for regulating the operation of said adjusting means, said control means comprising an adjustable humidostat having an element that changes dimensions with changes in relative humidity, means for contacting said element with a portion of the gas leaving the duct system, and means for cooling said portion of the gas to a predetermined temperature above its dew point before it contacts said element.

CHARLES R. DOWNS.
JOSEPH W. SPISELMAN.

CERTIFICATE OF CORRECTION.

Patent No. 2,173,802. September 19, 1939.

CHARLES R. DOWNS, ET AL.

It is hereby certified that error appears in the printed specification of the above numbered patent requiring correction as follows: Page 5, second column, line 23, claim 6, for "contant" read constant; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.